US008947811B1

(12) United States Patent
McFadyen

(10) Patent No.: US 8,947,811 B1
(45) Date of Patent: Feb. 3, 2015

(54) DISK DRIVE USING PREAMBLE AND POSTAMBLE TO ADJUST ASYNCHRONOUS SIGNAL SAMPLES OF PAYLOAD

(71) Applicant: Western Digital Technologies, Inc., Irvine, CA (US)

(72) Inventor: James P. R. McFadyen, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/796,317

(22) Filed: Mar. 12, 2013

(51) Int. Cl.
G11B 5/09 (2006.01)
G11B 20/10 (2006.01)

(52) U.S. Cl.
CPC .............................. *G11B 20/10231* (2013.01)
USPC .................. 360/51; 360/26; 360/39; 360/65; 360/77.02

(58) Field of Classification Search
None
See application file for complete search history.

(56) References Cited

U.S. PATENT DOCUMENTS

| | | | |
|---|---|---|---|
| 5,654,854 A | 8/1997 | Mallary | |
| 6,009,549 A * | 12/1999 | Bliss et al. | 714/769 |
| 6,111,710 A * | 8/2000 | Feyh et al. | 360/46 |
| 6,111,712 A * | 8/2000 | Vishakhadatta et al. | 360/51 |
| 6,498,696 B1 | 12/2002 | Salo et al. | |
| 6,657,428 B2 | 12/2003 | Kim | |
| 6,810,485 B2 * | 10/2004 | McEwen et al. | 713/503 |
| 6,907,322 B2 | 6/2005 | Ghoshal | |
| 7,054,088 B2 * | 5/2006 | Yamazaki et al. | 360/65 |
| 7,136,244 B1 | 11/2006 | Rothberg | |
| 7,365,531 B2 | 4/2008 | Che et al. | |
| 7,397,622 B1 | 7/2008 | Liikanen et al. | |
| 7,466,782 B1 * | 12/2008 | Patapoutian | 375/355 |
| 7,502,427 B2 * | 3/2009 | Annampedu et al. | 375/340 |
| 7,561,368 B2 | 7/2009 | Kim et al. | |
| 7,821,731 B2 * | 10/2010 | Sutardja et al. | 360/51 |
| 7,990,137 B2 | 8/2011 | Antoku | |
| 7,995,304 B2 * | 8/2011 | Ozturk et al. | 360/77.04 |
| 8,049,983 B1 * | 11/2011 | Han et al. | 360/51 |
| 8,139,301 B1 * | 3/2012 | Li et al. | 360/39 |
| 8,161,361 B1 | 4/2012 | Song et al. | |
| 8,395,858 B1 * | 3/2013 | Han et al. | 360/51 |
| 8,605,379 B1 * | 12/2013 | Sun | 360/51 |
| 2003/0030934 A1 | 2/2003 | Schaff et al. | |
| 2006/0002689 A1 | 1/2006 | Yang et al. | |
| 2008/0278837 A1 * | 11/2008 | Pan et al. | 360/39 |
| 2011/0002211 A1 * | 1/2011 | Ratnakar Aravind | 369/59.19 |
| 2012/0019945 A1 | 1/2012 | Chan et al. | |

* cited by examiner

Primary Examiner — Dismery Mercedes

(57) ABSTRACT

A disk drive is disclosed comprising a head actuated over a disk, wherein data is written to the disk comprising a first periodic pattern, a payload, and a second periodic pattern. The data is first read from the disk to generate a first read signal, and the first read signal is sampled asynchronously to generate first asynchronous signal samples. The first asynchronous signal samples representing the first periodic pattern are processed to measure a first phase, and the first asynchronous signal samples representing the second periodic pattern are processed to measure a second phase. A first phase error is generated based on a difference between the first phase and the second phase. The first asynchronous signal samples representing the payload are adjusted in response to the first phase error to generate first adjusted asynchronous signal samples.

22 Claims, 4 Drawing Sheets

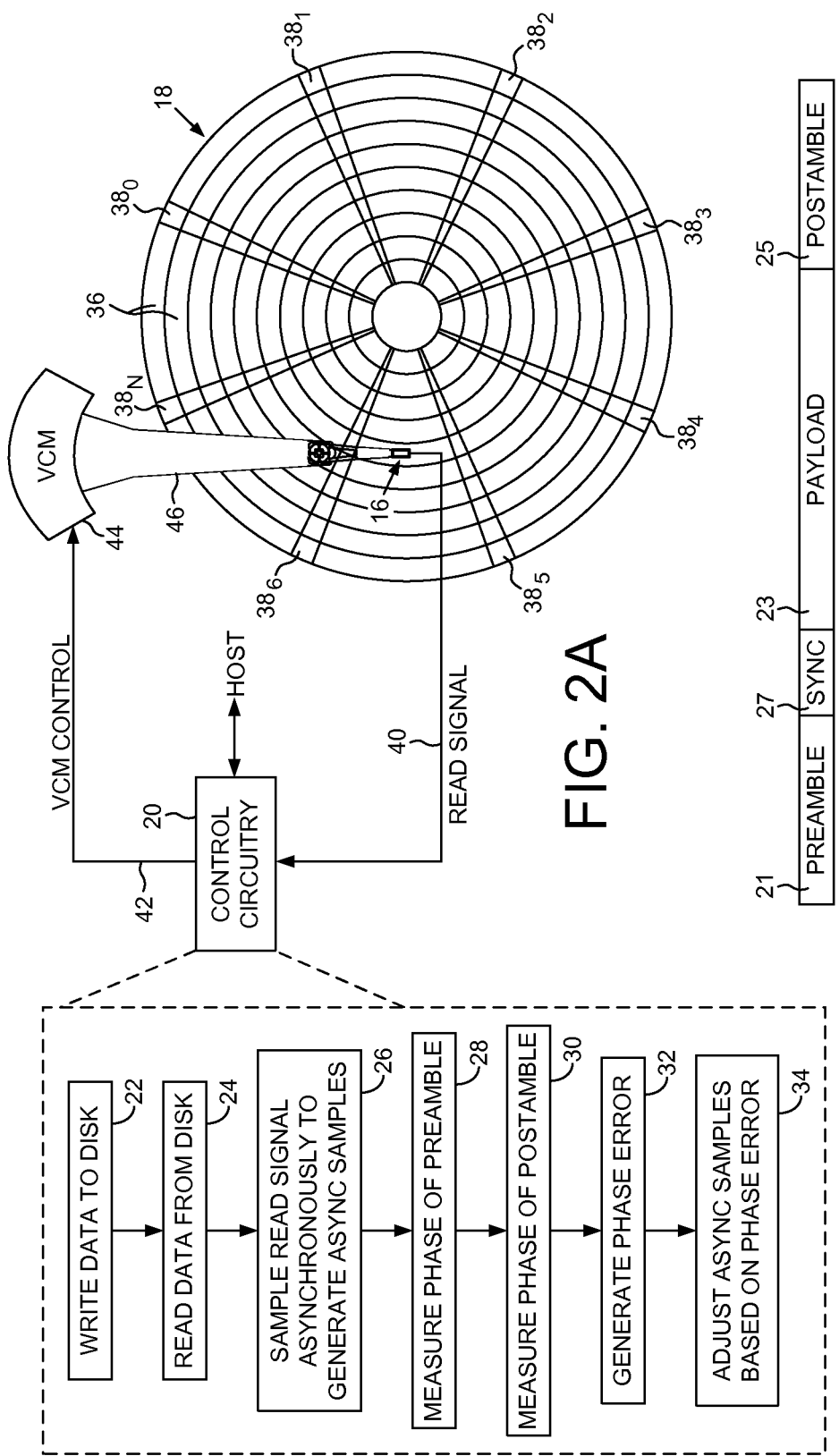

DISK DRIVE USING PREAMBLE AND POSTAMBLE TO ADJUST ASYNCHRONOUS SIGNAL SAMPLES OF PAYLOAD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (A,B,C,D in the example shown), which are recorded with precise intervals and offsets relative to the servo track centerlines. The servo bursts 14 provide fine head position information used for centerline tracking while accessing a data track during write/read operations.

BRIEF DESCRIPTION OF THE DRAWINGS

FIG. 2A shows a disk drive according to an embodiment comprising a head actuated over a disk.

FIG. 2B is a flow diagram according to an embodiment wherein data comprising a first periodic pattern, a payload, and a second periodic pattern is written to and read from the disk, and the payload samples adjusted based on a phase error between the first and second periodic patterns.

FIG. 2C shows an embodiment wherein the written data comprises a preamble (first periodic pattern), a sync mark, a payload, and a postamble (second periodic pattern).

DETAILED DESCRIPTION

Figure 1:
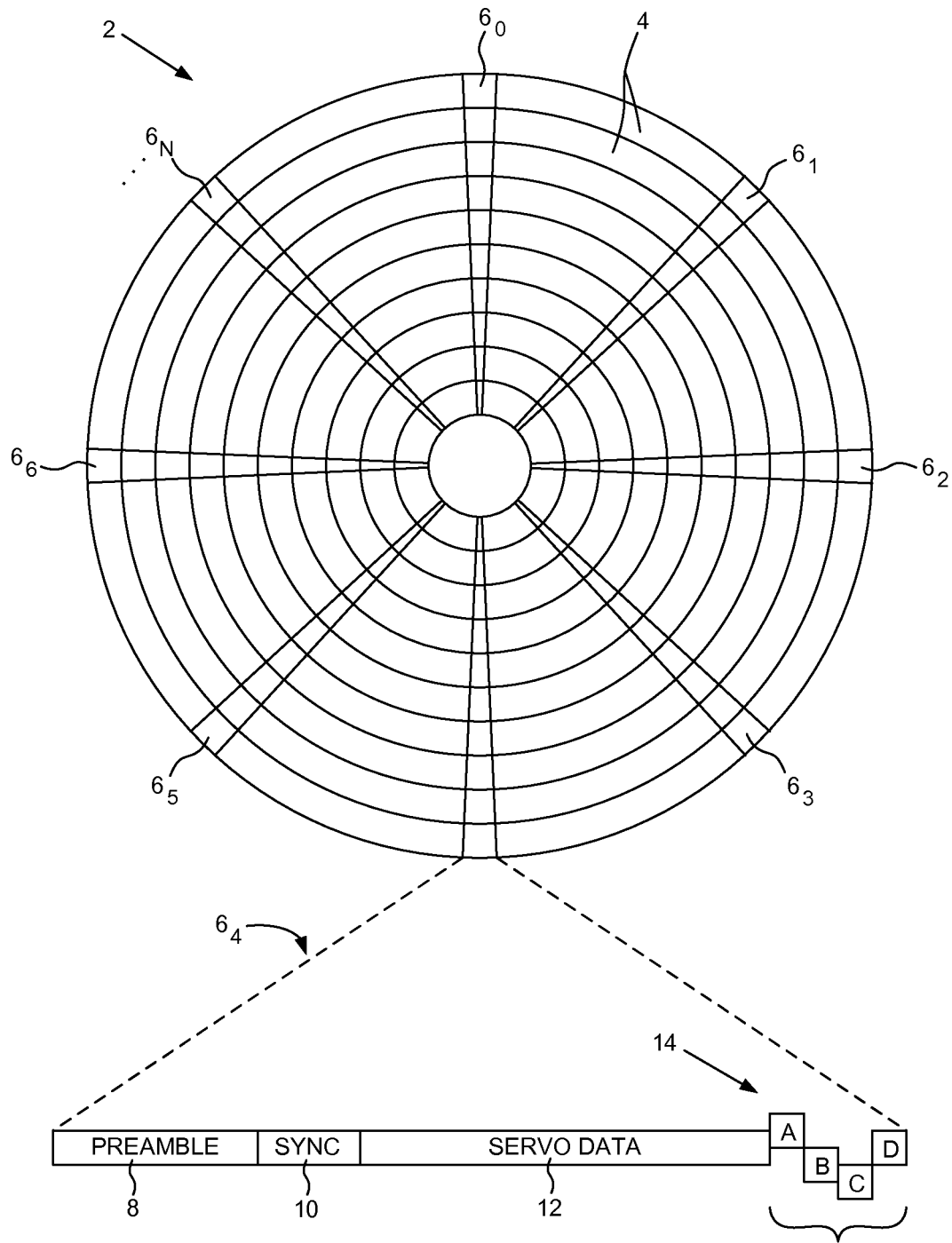
FIG. 1 shows a prior art disk format comprising a plurality of servo tracks defined by embedded servo sectors.

FIG. 2A shows a disk drive according to an embodiment comprising a head 16 actuated over a disk 18, and control circuitry 20 operable to execute the flow diagram of FIG. 2B. Data is written to the disk (FIG. 2C) comprising a first periodic pattern 21 (e.g., a preamble), a payload 23, and a second periodic pattern 25 (e.g., a postamble) (block 22). The data is first read from the disk to generate a first read signal (block 24), and the first read signal is sampled asynchronously to generate first asynchronous signal samples (block 26). The first asynchronous signal samples representing the first periodic pattern are processed to measure a first phase (block 28), and the first asynchronous signal samples representing the second periodic pattern are processed to measure a second phase (block 30). A first phase error is generated based on a difference between the first phase and the second phase (block 32). The first asynchronous signal samples representing the payload are adjusted in response to the first phase error to generate first adjusted asynchronous signal samples (block 34).

In the embodiment of FIG. 2A, a plurality of concentric servo tracks 36 are defined by embedded servo sectors $38_0$-$38_N$, wherein a plurality of concentric data tracks are defined relative to the servo tracks 36. The control circuitry 20 processes a read signal 40 emanating from the head 16 to demodulate the servo sectors and generate a position error signal (PES) representing an error between the actual position of the head and a target position relative to a target track. The control circuitry 20 filters the PES using a suitable compensation filter to generate a control signal 42 applied to a voice coil motor (VCM) 44 which rotates an actuator arm 46 about a pivot in order to actuate the head 16 radially over the disk 18 in a direction that reduces the PES. The servo sectors may comprise any suitable head position information, such as a track address for coarse positioning and servo bursts for fine positioning. The servo bursts may comprise any suitable pattern, such as an amplitude based servo pattern (FIG. 1) or a phase based servo pattern.

The payload 23 in FIG. 2C may represent any suitable data, wherein in one embodiment the payload 23 comprises a test pattern written to the disk during a diagnostic or calibration procedure of the disk drive. For example, in one embodiment a test pattern may be written to and read from the disk in order to evaluate the performance characteristics of a component, such as the performance characteristics of the head 16. As an example, it may be desirable to evaluate a stability characteristic of a magnetoresistive read element of the head 16 by reading the test pattern from the disk and evaluating a non-repeatable signal noise in the read signal. That is, the non-repeatable signal noise may be indicative of head instability which is a random phenomena whereas repeatable signal noise is typically caused by fixed anomalies, such as defects on the disk or tracking errors due to written-in errors in the servo sectors. In order to adequately test a component of the disk drive, it may be desirable to write a test pattern comprising one or more frequencies that have little or no timing recovery information. For example, it may be desirable to write a DC test pattern to the disk in order to evaluate the non-repeatable signal noise in the read signal. In one embodiment, sampling the read signal asynchronously and performing timing recovery using the preamble 21 and postamble 25 (rather than over the payload 23) enables the test pattern to be written with any desirable frequency components.

In another embodiment, the payload 23 in FIG. 2C may comprise user data of an unrecoverable data sector encountered during a read operation. During a retry read operation, the data sector may be read and the read signal sampled asynchronously. The preamble of the unrecoverable data sector may be processed as the first periodic pattern 21, and the preamble of the following data sector may be processed as the second periodic pattern 25 in order to compensate for the frequency error in the signal samples. That is, the preamble of a following data sector may be used as a postamble to an unrecoverable data sector during a retry operation.

Figure 3A:
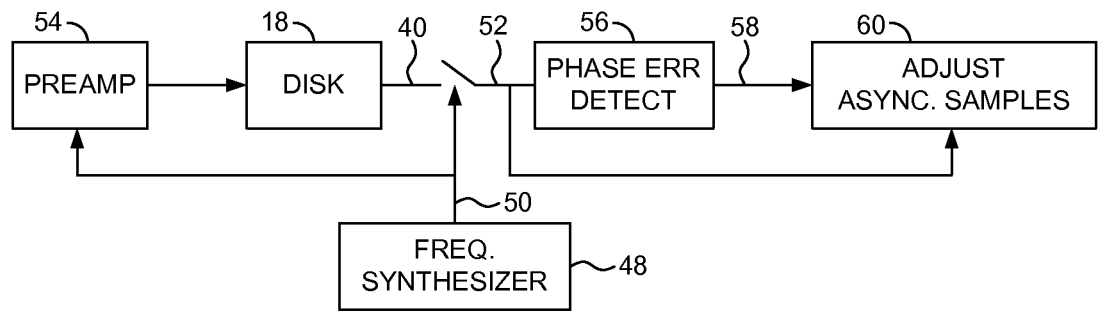
FIG. 3A shows control circuitry according to an embodiment comprising a frequency synthesizer for generating an asynchronous sampling clock, and a phase error detector operable to detect a phase error between the first and second periodic patterns.
Figure 3B:
FIG. 3B illustrates an example wherein the sampling frequency matches the rotation frequency of the disk, and therefore there is no phase error between the first and second periodic patterns.
Figure 3C:
FIG. 3C illustrates an example wherein an error between the sampling frequency and the rotation frequency of the disk results in a phase error between the first and second periodic patterns.

FIG. 3A shows control circuitry according to an embodiment wherein a frequency synthesizer 48 generates a sampling clock 50 for sampling the read signal 40 asynchronously to generate asynchronous signal samples 52. In one embodiment, the sampling clock 50 is generated at the same frequency used to write the payload 23 to the disk 18; that is, the frequency synthesizer 48 applies the sampling clock 50 to a preamp 54 during the write operation so that the payload 23 is written to the disk 18 at a target frequency. If when reading the payload 23 the disk is rotating at the same frequency as when the payload 23 was written, then there will be no frequency error between the sampling clock 50 and the rotation frequency of the disk. Consequently, there will be no phase error between the signal samples of the preamble 21 and the signal samples of the postamble 25 as illustrated in FIG. 3B. However, if when reading the payload 23 the disk is rotating at a different frequency as when the payload 23 was written, then the frequency error will induce a phase error between the signal samples of the preamble 21 and the signal samples of the postamble 25 as illustrated in FIG. 3C. Accordingly in the embodiment of FIG. 3A, a phase error detector 56 processes the asynchronous signal samples 52 to detect the phase error 58 between the postamble 25 and the preamble 21. The phase error 58 is then used at block 60 to adjust the asynchronous signal samples representing the payload 23.

In one embodiment, the data written to the disk at block 22 of FIG. 2B is read multiple times to generate a plurality of buffered asynchronous signal samples representing the payload 23. After adjusting for the frequency error in each of the buffered sequences (and in one embodiment a phase error between the sequences), the sequences are amplitude normalized and averaged to generate a nominal sequence. A difference between the nominal sequence and each frequency/phase adjusted sequence is generated in order to extract the non-repeatable signal noise from each sequence, wherein the non-repeatable signal noise may indicate a faulty component, such as a faulty head.

Figure 4:
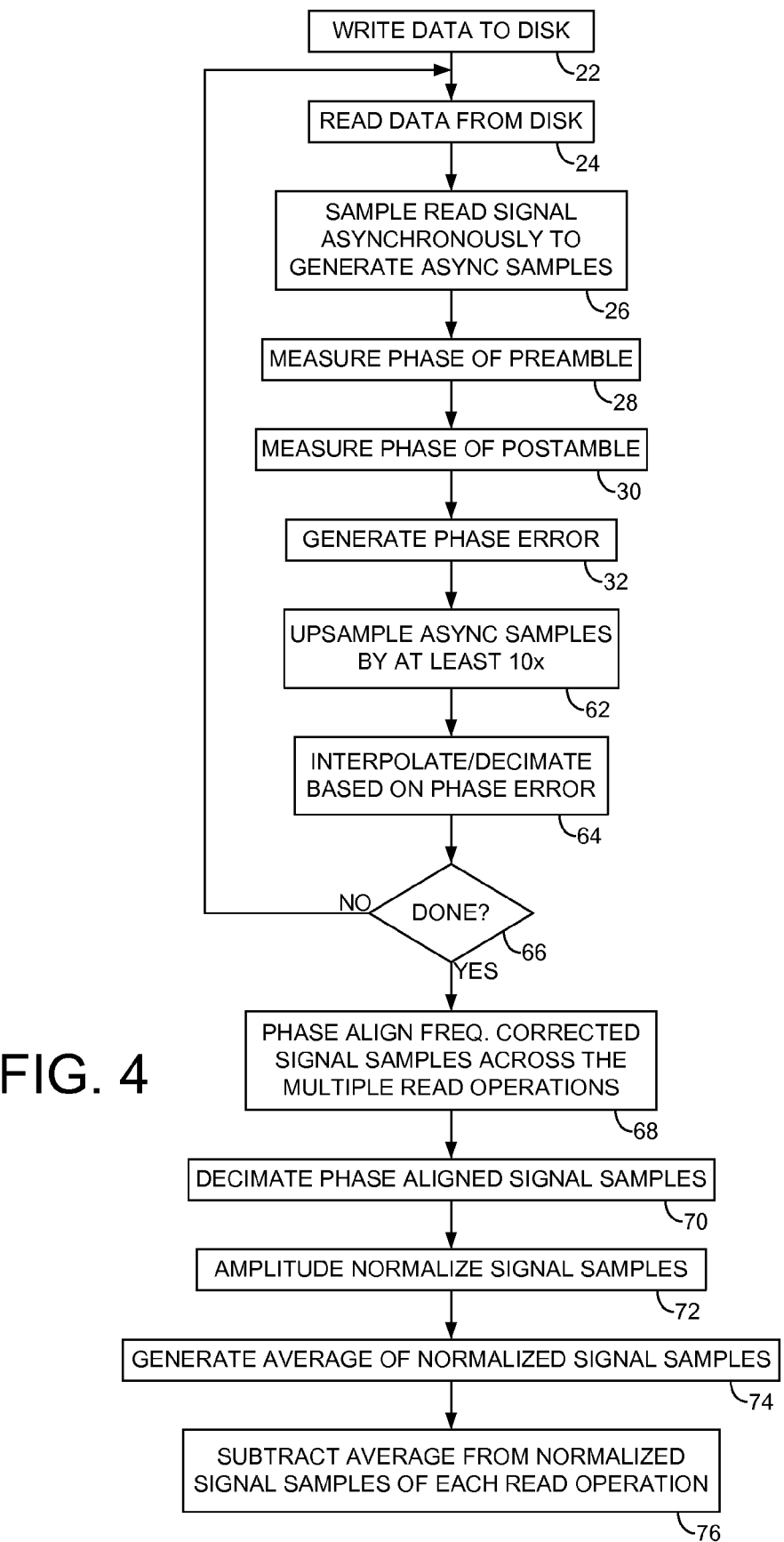
FIG. 4 is a flow diagram according to an embodiment wherein the asynchronous signal samples of the payload are upsampled and processed to compensate for the frequency error between the sampling frequency and the rotation frequency of the disk.

This embodiment is understood with reference to the flow diagram of FIG. 4 which extends on the flow diagram of FIG. 2B, wherein after generating the phase error (block 32) during a first read of the data, the asynchronous signal samples are upsampled by at least ten times (block 62). In one embodiment, upsampling the asynchronous signal samples may be achieved using a suitable interpolation algorithm. The frequency error in the signal samples of the payload 23 is then compensated based on the measured phase error (block 64). In one embodiment, the frequency error is compensated by upsampling or decimating the upsampled asynchronous signal samples depending on the polarity of the frequency error.

When the phase error indicates the frequency error is negative (meaning that the frequency of the signal samples is too low relative to the data written on the disk), then the frequency error is compensated by further upsampling the upsampled asynchronous signal samples. The upsampling may be implemented in any suitable manner and with any suitable resolution relative to the magnitude of the phase error. In one embodiment, the upsampling is implemented by dividing the phase error into a number of signal sample periods, and then inserting an interpolated signal sample into the upsampled asynchronous signal samples at a corresponding interval. For example, consider the simple example where the upsampled asynchronous signal samples comprise 1100 samples, and the phase error spans 10 signal sample periods. An interpolated signal sample may be inserted into the upsampled asynchronous signal samples every 100 samples in order to compensate for the frequency error.

When the phase error indicates the frequency error is positive (meaning that the frequency of the signal samples is too high relative to the data written on the disk), then the frequency error is compensated by decimating the upsampled asynchronous signal samples. In the above example where the upsampled asynchronous signal samples comprise 1100 samples, and the phase error spans 10 signal sample periods, a signal sample may be decimated (removed) from the upsampled asynchronous signal samples every 100 samples in order to compensate for the frequency error.

The flow diagram of FIG. 4 is repeated at block 66 in order to reread the data from the disk and generate multiple of the upsampled, frequency compensated asynchronous signal samples representing the payload 23. During each read operation, the rotation frequency of the disk may be slightly different and therefore the resulting frequency error may be slightly different. In addition, the start of each read operation may vary slightly resulting in a global phase error in the signal samples relative to each read operation. Accordingly, in one embodiment after compensating for the frequency error in each sequence of signal samples representing each read operation, the global phase error is compensated by phase aligning the upsampled sequences (block 68). In one embodiment, all of the sequences are phase aligned to one of the sequences, such as the sequence generated during the first read operation. Phase aligning the upsampled sequences may be implemented in any suitable manner, such as by phase shifting each sequence relative to the target sequence until a correlation between the sequences reaches a maximum.

After compensating for the frequency error in each upsampled sequence and phase aligning the upsampled sequences, the upsampled sequences are decimated (block 70) by the inverse amount of upsampling in block 62. The signal samples in each sequence are amplitude normalized (block 72), for example, by computing the average signal amplitude across all of the sequences, and then adjusting the amplitude of each sequence based on the average amplitude. Amplitude normalizing the sequences may help account for variations in signal quality that occur across the multiple read operations due, for example, to off-track errors or fly height errors. An average waveform is then generated by averaging the amplitude normalized sequences (block 74), and the average waveform is then subtracted from each normalized sequence of signal samples in order to extract the non-repeatable signal noise. In one embodiment, the non-repeatable signal noise may be evaluated, for example, to identify faulty components, such as an unstable read element as described above.

The phase error detector 56 in FIG. 3A may compute the phase error between the first periodic pattern 21 and the second periodic pattern 25 (FIG. 3C) in any suitable manner. In one embodiment, the phase error detector 56 may compute the phase of the first periodic pattern 21 by computing a discrete Fourier transform (DFT), and in one embodiment, by computing a single frequency DFT at the frequency of the periodic pattern. The phase error detector 56 may also similarly compute the phase of the second periodic pattern 25 using a single frequency DFT, and then subtract the two phase measurements to generate the phase error 58.

In the example of FIG. 3C, the first periodic pattern 21 and the second periodic pattern 25 comprises a 2T signal, such as a non-return to zero (NRZ) sequence comprising (+1+1−1−1+1+−1−1 . . . ). In another embodiment, the first and second periodic patterns may be written at a much lower frequency, such as a 16T signal in order to detect a phase error caused by the frequency error that spans up to 16T. Other embodiments may employ an even lower frequency periodic pattern in order to accommodate even larger phase errors that may be caused by larger frequency errors.

In the embodiment of FIG. 2C, the data written to the disk comprises a sync mark 27 following the first periodic pattern 21 which is used to detect the beginning of the payload 23. In addition, the sync mark 27 in each sequence generated during each read of the data may also be used to coarsely phase align (within a signal sample period) the payloads 23 of the resulting sequences. In one embodiment, since the data is sampled asynchronously without employing any real-time timing recovery, the sync mark 27 may be recorded as a low frequency, long sequence of bits (e.g., 160 bits) which helps ensure accurate detection of the sync mark 27 within the asynchronous signal samples.

In one embodiment, the written data shown in FIG. 2C may be read multiple times without performing the phase-alignment and averaging process described above with respect to the flow diagram of FIG. 4. For example, when attempting to recover a data sector during retry operations, each sequence of asynchronous signal samples may be processed independently in an attempt to recover the data sector. In another embodiment, only some of the processing in the flow diagram of FIG. 4 may be performed on each sequence of asynchronous signal samples, such as phase-aligning and averaging in order to improve the signal-to-noise ratio of the asynchronous signal samples without attempting to extract the non-repeatable noise from the read signal.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
a disk;
a head actuated over the disk; and
control circuitry operable to:
write data to the disk, the data comprising a first periodic pattern, a payload, and a second periodic pattern;
first read the data from the disk to generate a first read signal;
sample the first read signal asynchronously to generate first asynchronous signal samples;
process the first asynchronous signal samples representing the first periodic pattern to measure a first phase;
process the first asynchronous signal samples representing the second periodic pattern to measure a second phase;
generate a first phase error based on a difference between the first phase and the second phase;
adjust the first asynchronous signal samples representing the payload in response to the first phase error to generate first adjusted asynchronous signal samples;
second read the data from the disk to generate a second read signal;
sample the second read signal asynchronously to generate second asynchronous signal samples;
process the second asynchronous signal samples representing the first periodic pattern to measure a third phase;
process the second asynchronous signal samples representing the second periodic pattern to measure a fourth phase;
generate a second phase error based on a difference between the third phase and the fourth phase;
adjust the second asynchronous signal samples representing the payload in response to the second phase error to generate second adjusted asynchronous signal samples; and
phase align the first adjusted asynchronous signal samples and the second adjusted asynchronous signal samples.

2. The disk drive as recited in claim 1, wherein the payload comprises a test pattern.

3. The disk drive as recited in claim 1, wherein the payload comprises user data.

4. The disk drive as recited in claim 1, wherein the control circuitry is further operable to:

write the data to the disk using a reference clock at a substantially fixed frequency; and
sample the first read signal asynchronously using the reference clock.

5. The disk drive as recited in claim 1, wherein the control circuitry is further operable to:
upsample the first asynchronous signal samples by at least a factor of ten to generate upsampled signal samples; and
adjust the upsampled signal samples in response to the first phase error.

6. The disk drive as recited in claim 5, wherein the control circuitry is further operable to perform at least one of:
upsample the upsampled signal samples in response to the first phase error; and
decimate the upsampled signal samples in response to the first phase error.

7. The disk drive as recited in claim 1, wherein the control circuitry is further operable to perform the phase align by:
upsampling the first asynchronous signal samples to generate first upsampled signal samples;
upsampling the second asynchronous signal samples to generate second upsampled signal samples; and
phase align the first upsampled signal samples with the second upsampled signal samples.

8. The disk drive as recited in claim 7, wherein the control circuitry is further operable to:
adjust the first upsampled signal samples in response to the first phase error; and
adjust the second upsampled signal samples in response to the second phase error.

9. The disk drive as recited in claim 1, wherein the control circuitry is further operable to amplitude normalize the phase aligned first and second adjusted asynchronous sample values to generate normalized first and second asynchronous signal samples.

10. The disk drive as recited in claim 9, wherein the control circuitry is further operable to:
generate averaged asynchronous signal samples in response to the normalized first and second asynchronous signal samples; and
subtract the averaged asynchronous signal samples from the normalized first and second asynchronous signal samples.

11. A method of operating a disk drive comprising a head actuated over a disk, the method comprising:
writing data to the disk, the data comprising a first periodic pattern, a payload, and a second periodic pattern;
first reading the data from the disk to generate a first read signal;
sampling the first read signal asynchronously to generate first asynchronous signal samples;
processing the first asynchronous signal samples representing the first periodic pattern to measure a first phase;
processing the first asynchronous signal samples representing the second periodic pattern to measure a second phase;
generating a first phase error based on a difference between the first phase and the second phase;
adjusting the first asynchronous signal samples representing the payload in response to the first phase error to generate first adjusted asynchronous signal samples;
second reading the data from the disk to generate a second read signal;
sampling the second read signal asynchronously to generate second asynchronous signal samples;
processing the second asynchronous signal samples representing the first periodic pattern to measure a third phase;
processing the second asynchronous signal samples representing the second periodic pattern to measure a fourth phase;
generating a second phase error based on a difference between the third phase and the fourth phase;
adjusting the second asynchronous signal samples representing the payload in response to the second phase error to generate second adjusted asynchronous signal samples; and
phase aligning the first adjusted asynchronous signal samples and the second adjusted asynchronous signal samples.

12. The method as recited in claim 11, wherein the payload comprises a test pattern.

13. The method as recited in claim 11, wherein the payload comprises user data.

14. The method as recited in claim 11, further comprising:
writing the data to the disk using a reference clock at a substantially fixed frequency; and
sampling the first read signal asynchronously using the reference clock.

15. The method as recited in claim 11, further comprising:
upsampling the first asynchronous signal samples by at least a factor of ten to generate upsampled signal samples; and
adjusting the upsampled signal samples in response to the first phase error.

16. The method as recited in claim 15, further comprising performing at least one of:
upsampling the upsampled signal samples in response to the first phase error; and
decimating the upsampled signal samples in response to the first phase error.

17. The method as recited in claim 11, further comprising phase aligning by:
upsampling the first asynchronous signal samples to generate first upsampled signal samples;
upsampling the second asynchronous signal samples to generate second upsampled signal samples; and
phase aligning the first upsampled signal samples with the second upsampled signal samples.

18. The method as recited in claim 17, further comprising:
adjusting the first upsampled signal samples in response to the first phase error; and
adjusting the second upsampled signal samples in response to the second phase error.

19. The method as recited in claim 11, further comprising amplitude normalizing the phase aligned first and second adjusted asynchronous sample values to generate normalized first and second asynchronous signal samples.

20. The method as recited in claim 19, further comprising:
generating averaged asynchronous signal samples in response to the normalized first and second asynchronous signal samples; and
subtracting the averaged asynchronous signal samples from the normalized first and second asynchronous signal samples.

21. A disk drive comprising:
a disk;
a head actuated over the disk; and
control circuitry operable to:
write data to the disk, the data comprising a first periodic pattern, a payload, and a second periodic pattern;

first read the data from the disk to generate a first read signal;
sample the first read signal asynchronously to generate first asynchronous signal samples;
process the first asynchronous signal samples representing the first periodic pattern to measure a first phase;
process the first asynchronous signal samples representing the second periodic pattern to measure a second phase;
generate a first phase error based on a difference between the first phase and the second phase;
adjust the first asynchronous signal samples representing the payload in response to the first phase error to generate first adjusted asynchronous signal samples;
upsample the first asynchronous signal samples by at least a factor of ten to generate upsampled signal samples; and
adjust the upsampled signal samples in response to the first phase error.

22. A method of operating a disk drive comprising a head actuated over a disk, the method comprising:
writing data to the disk, the data comprising a first periodic pattern, a payload, and a second periodic pattern;
first reading the data from the disk to generate a first read signal;
sampling the first read signal asynchronously to generate first asynchronous signal samples;
processing the first asynchronous signal samples representing the first periodic pattern to measure a first phase;
processing the first asynchronous signal samples representing the second periodic pattern to measure a second phase;
generating a first phase error based on a difference between the first phase and the second phase;
adjusting the first asynchronous signal samples representing the payload in response to the first phase error to generate first adjusted asynchronous signal samples;
upsampling the first asynchronous signal samples by at least a factor of ten to generate upsampled signal samples; and
adjusting the upsampled signal samples in response to the first phase error.

* * * * *